(12) United States Patent
De Sousa et al.

(10) Patent No.: US 9,897,011 B2
(45) Date of Patent: Feb. 20, 2018

(54) GAS TURBINE ENGINE COMPRISING AN EXHAUST CONE ATTACHED TO THE EXHAUST CASING

(71) Applicant: SNECMA, Paris (FR)

(72) Inventors: Mario Cesar De Sousa, Cesson (FR); Baghdad Achbari, Montereau Fault Yonne (FR); Benoit Argemiro Matthieu Debray, Saint-Maur-des-Fosses (FR); Sylvain Pichon, Chatou (FR); Gregory Ghosarossian-Prillieux, Brie Comte Robert (FR); Frederic Noel, Yerres (FR); Nicolas Pommier, Acheres (FR); Mathieu Ange Poisson, Melun (FR)

(73) Assignee: SNECMA, Paris (FR)

( * ) Notice: Subject to any disclaimer, the term of this patent is extended or adjusted under 35 U.S.C. 154(b) by 197 days.

(21) Appl. No.: 14/403,305

(22) PCT Filed: Jun. 20, 2013

(86) PCT No.: PCT/FR2013/051450
§ 371 (c)(1),
(2) Date: Nov. 24, 2014

(87) PCT Pub. No.: WO2013/190246
PCT Pub. Date: Dec. 27, 2013

(65) Prior Publication Data
US 2015/0152788 A1 Jun. 4, 2015

(30) Foreign Application Priority Data

Jun. 21, 2012 (FR) ...................... 12 55853

(51) Int. Cl.
*F02C 1/00* (2006.01)
*F02C 7/32* (2006.01)
(Continued)

(52) U.S. Cl.
CPC ................ *F02C 7/32* (2013.01); *F01D 25/24* (2013.01); *F01D 25/30* (2013.01); *F02K 1/04* (2013.01);
(Continued)

(58) Field of Classification Search
CPC .... F02C 7/32; F02C 7/20; F01D 25/24; F01D 25/30; F01D 25/28; F01D 25/243;
(Continued)

(56) References Cited

U.S. PATENT DOCUMENTS 2,945,704 A * 7/1960 Korn .................. F16B 5/06
102/473
3,066,959 A 12/1962 White
(Continued)

FOREIGN PATENT DOCUMENTS

DE 100 36 211 2/2002
EP 0 979 974 2/2000
(Continued)

OTHER PUBLICATIONS

International Search Report dated Sep. 24, 2013 in PCT/FR13/051450 Filed Jun. 20, 2013.

*Primary Examiner* — Pascal M Bui Pho
*Assistant Examiner* — Edwin Kang
(74) *Attorney, Agent, or Firm* — Oblon, McClelland, Maier & Neustadt, L.L.P.

(57) ABSTRACT

An assembly including an exhaust casing and an exhaust cone for a gas turbine engine, each including an axial annular flange, the two flanges being inserted into one another, one being radially external and the other radially internal, and held together by a mechanical attachment, and the assembly further including a guide by which, during operation of assembling the annular flanges to each other,
(Continued)

the exhaust cone is in a predetermined angular position relative to the exhaust casing.

8 Claims, 2 Drawing Sheets

(51) Int. Cl.
    *F01D 25/24*     (2006.01)
    *F02K 1/04*     (2006.01)
    *F02K 1/80*     (2006.01)
    *F01D 25/30*     (2006.01)

(52) U.S. Cl.
    CPC ............ *F02K 1/80* (2013.01); *F05D 2220/32* (2013.01); *F05D 2230/60* (2013.01); *F05D 2240/91* (2013.01)

(58) Field of Classification Search
    CPC . F01D 25/246; F02K 1/80; F02K 1/04; F05D 2260/30; F05D 2240/90; F05D 2240/91
    See application file for complete search history.

(56) References Cited

U.S. PATENT DOCUMENTS

| | | | |
|---|---|---|---|
| 4,907,743 A * | 3/1990 | Bouiller | F02K 1/04 239/265.11 |
| 5,145,276 A | 9/1992 | Demange | |
| 5,290,974 A * | 3/1994 | Douglas | F01N 13/1805 181/228 |
| 6,053,697 A | 4/2000 | Piekarski et al. | |
| 6,125,627 A | 10/2000 | Rice et al. | |
| 2003/0019205 A1 | 1/2003 | Rice et al. | |
| 2005/0053463 A1* | 3/2005 | Kopp | F01D 9/026 415/214.1 |
| 2005/0253379 A1* | 11/2005 | Ress, Jr. | F01D 11/00 285/92 |
| 2007/0108762 A1 | 5/2007 | Buschmann et al. | |
| 2008/0060344 A1* | 3/2008 | Durocher | F02K 1/04 60/262 |
| 2010/0051112 A1 | 3/2010 | Dieling | |
| 2010/0287949 A1 | 11/2010 | Buschmann et al. | |
| 2011/0036068 A1 | 2/2011 | Lefebvre et al. | |
| 2011/0038706 A1 | 2/2011 | Lefebvre et al. | |
| 2013/0121814 A1 | 5/2013 | Hurlin et al. | |
| 2014/0053563 A1 | 2/2014 | De Sousa et al. | |

FOREIGN PATENT DOCUMENTS

| | | |
|---|---|---|
| EP | 1 783 325 | 5/2007 |
| EP | 2 161 431 | 3/2010 |
| EP | 2 202 388 | 6/2010 |
| FR | 2 955 152 | 7/2011 |
| FR | 2 961 788 | 12/2011 |
| JP | 2000 18096 | 1/2000 |
| WO | 2013 024216 | 2/2013 |

* cited by examiner

GAS TURBINE ENGINE COMPRISING AN EXHAUST CONE ATTACHED TO THE EXHAUST CASING

TECHNICAL FIELD

The present invention relates to the technical field of gas turbine engines, in particular turbojet engines, and relates to the mounting of the exhaust cone, situated at the rear of the engine, on the exhaust casing thereof.

PRIOR ART

A turbojet engine comprises an air intake duct upstream, through which the air is sucked into the engine, and a pipe downstream through which the hot gases produced by the combustion of a fuel are ejected in order to supply part of the thrust at least. Between the intake duct and the ejection pipe for the gases, the aspirated air is compressed by compression means, heated and expanded in turbines that drive the compression means. Multi-flow turbojet engines further comprise at least one fan rotor moving a large mass of air, forming the secondary flow and supplying most of the thrust. The primary flow is the part of the aspirated air flow that is heated and then expanded in the turbine before being ejected through the primary-flow pipe.

A turbojet engine consists of rotors mounted on a fixed structure by means of bearings. The fixed structure has upstream a casing supporting the upstream bearings and forming the so-called intermediate casing. At the downstream end of the engine, the structure supporting the bearings forms the exhaust casing. Said exhaust casing comprises a hub and annular collars connected together by radial arms, said arms passing through the stream of the primary flow. Downstream of the exhaust casing the stream is delimited externally by the pipe ejecting the primary flow and, internally, by a part having a roughly frustoconical shape that is designated by the expression exhaust cone. This part is generally fixed to the exhaust casing by bolting.

The present invention relates to the method of attaching the exhaust cone to the exhaust casing.

Turbojet engines of the prior art, such as those in the CFM 56 engine family of the applicant, are provided with an exhaust cone mounted on the exhaust casing.

According to a known attachment method, the exhaust casing is provided with an annular flange oriented radially in a transverse plane and connected by bolts to a corresponding flange on the upstream edge of the exhaust cone. The bolts have thus an axial orientation and are housed in pockets provided in the wall of the exhaust cone to allow access thereto from the gas stream. When the cone is mounted on the casing, the parts are positioned flange against flange and mechanical attachment means such as bolts or screws are slid into the pockets so that they are engaged in the orifices in the flanges and screwed. It is necessary in this case, after the attachment means are fitted, to cover each of the pockets with a closure cowl in order to ensure continuity of the gas stream and to limit the aerodynamic impact. For example, it is necessary to provide twelve pockets with closure cowls for attaching an exhaust cone on a CFM engine.

According to another known attachment method, the exhaust cone is in two parts: an upstream part and a downstream part. The upstream part of the cone is mounted on the exhaust casing in the same way as before by bolting two radial flanges with axially oriented bolts. However, providing pockets on the upstream part of the cone is avoided since it is possible to have access to the connection region between the cone and the exhaust casing through the inside of the upstream part of the cone, after having removed the rear part. On assembly, the upstream part of the cone is first of all placed against the flange of the casing, bolts are inserted through the downstream opening of this part and the flanges are rigidly connected to each other. The space is sufficient to perform these operations from the rear. Once the attachment has ended, the downstream part of the exhaust cone is fitted on the upstream part and also attached by bolting, but here the connection surfaces are oriented tangentially to the walls of the cone. It should be noted that this solution makes the demounting/mounting operations more difficult. It requires the use of a number of bolts twice that of the previous solution and an additional flange must be provided. Moreover, this projecting mass is not desirable with regard to the dynamic behaviour.

The present applicant has developed a means of assembling an exhaust casing and an exhaust cone by means of flanges. The exhaust casing and the exhaust cone each comprise an annular flange oriented axially, the two flanges being engaged in each other, one being external and the other internal, and held together by mechanical means.

This solution has numerous advantages: the mass of the connecting region between the two parts is substantially lightened compared with the prior solutions. The result is an improvement in thermomechanical behaviour because of the reduction in the thermal masses and thermal gradients. Moreover, mounting/demounting requires fewer operations and this connection has no unfavourable aerodynamic impact.

The present invention aims to improve this assembly mode. It is in fact found that the demounting of the exhaust cone, essential for accessing the cavities of the rear bearings, is a very frequent operation in maintenance. However, because of the size of the part, mounting blind gives rise to poor guidance and risks of jamming that prevent correct angular orientation of the holes in the cone on those in the casing flange. Conversely, on demounting, any jamming of the flange after functioning may affect this operation, which then proves to be tricky, requiring several extraction and replacement manipulations before arriving at the alignment of the bolted connections required for remounting. These repeated manipulations result in degradation of the functional faces of the flanges.

The problem of the invention therefore relates to the development of a means acting during the mounting and demounting procedure. This means aims to make it possible to reduce manipulations that give rise to degradation of the flanges, possible accidents liable to be caused by the stress of the operators and potential readjustments. These procedures are particular tricky when the parts have a large diameter as may be the case in a gas turbine engine forming a turbojet engine for example.

SUMMARY OF THE INVENTION

In accordance with the invention, these objectives are achieved by means of an assembly comprising an exhaust casing and an exhaust cone for a gas turbine engine, each comprising an axial annular flange, the two flanges being engaged in each other, one being radially, with respect to the axis of the engine, external, the other radially internal, and held together by mechanical connection means, characterised in that it comprises a guiding means by means of which, during the operation of assembling one with the other, the exhaust cone occupies an angular position about its axis that is predetermined with respect to the exhaust casing.

The guiding means thus frees the operator and enables him to concentrate on the movement and axial positioning of the two parts with respect to each other.

The flanges of the two parts: exhaust cone and casing, can indifferently be one internal, the other external.

More particularly, the flanges of the two parts have radial piercings in which the mechanical attachment means are engaged. These attachment means are then preferably screws. The screws are engaged from the stream in the orifices in the external flange cooperating with tapped orifices in the internal flange. For example, the tapped orifices are provided in nuts attached to the internal flange. These are in particular riveted floating nuts or clamped nuts.

Preferably, the heads of the screws are at least partly embedded in the thickness of the wall of the exhaust cone so as to reduce the aerodynamic impact.

This guiding means is produced simply, with a means forming a radial protuberance on one of the two flanges, and a means for axial guidance of the means forming a protuberance on the other flange. The axial guiding means is advantageously produced in the form of a groove. The means forming a protuberance may be a pin attached to the other flange, such as rivet.

The mass of the assembly is improved by scalloping the flanges, at least one of the flanges is scalloped radially having a wall thickness around orifices that is greater than between the orifices.

In accordance with another feature, in this case the axial guiding means is arranged to also form a foolproofing means. This is because it is necessary to avoid the means forming a protuberance being engaged in a scallop that could be confused by the operator with the axial guiding means. The foolproofing means ensures the correct positioning of the means forming a protuberance.

The foolproofing is achieved only when the flange comprising the guiding means is radially scalloped. In which case the guiding means comprises a groove at a scallop, the bottom of which is at a distance from the axis of the cone which is less than the distance from the bottom of said scallop.

In accordance with an embodiment, the annular flange of the exhaust casing is attached to the downstream edge of the exhaust casing, which is advantageous with regard to manufacture of the exhaust casing. This solution is advantageous in the case where a forged flange proves necessary for improving the mechanical strength, this having better mechanical properties than those that are cast.

The connection of the two flanges, internal and external, to each other may also be obtained by press fitting. The materials of the two flanges then preferably have identical coefficients of expansion.

BRIEF DESCRIPTION OF THE FIGURES

Other features and advantages will emerge from the following description of a non-limitative embodiment of the invention with reference to the drawings, in which.

DETAILED DESCRIPTION OF AN EMBODIMENT

Figure 1:
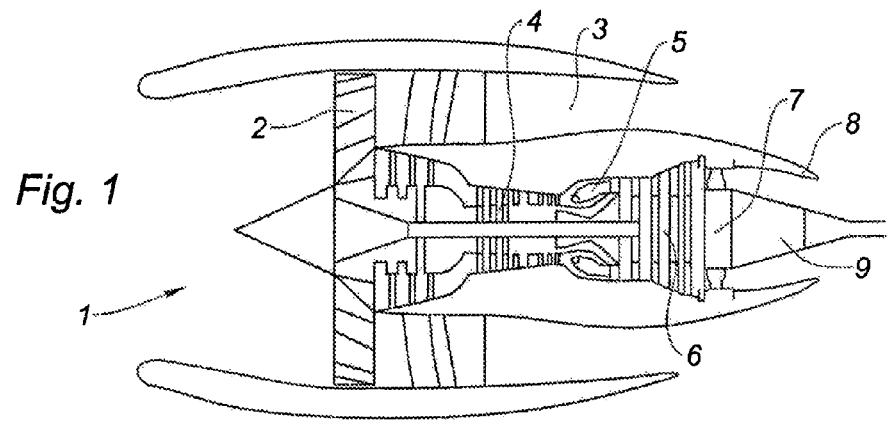
FIG. 1 shows the simplified diagram of a bypass turbojet engine in axial section.

The turbojet engine of FIG. 1 is of the bypass and double spool type comprising successively, in the direction of travel of the air through the engine, an air intake upstream supplying a fan 2 discharging the air in part in an annular secondary-flow channel 3 and in part to the compressors 4 of the primary flow at the centre, the combustion chamber 5, and the turbine stages 6. Downstream the rotors are supported by the exhaust casing 7. The primary flow is ejected through the primary-flow pipe 8 downstream of the exhaust casing. The flow is annular and the stream of the primary flow is delimited internally by the exhaust cone 9. The cone 9 is a hollow part substantially frustoconical in form, rigidly connected to the exhaust casing 7. This part is open downstream. The channel discharging the residual oils from the engine emerges in this opening.

Figure 2:
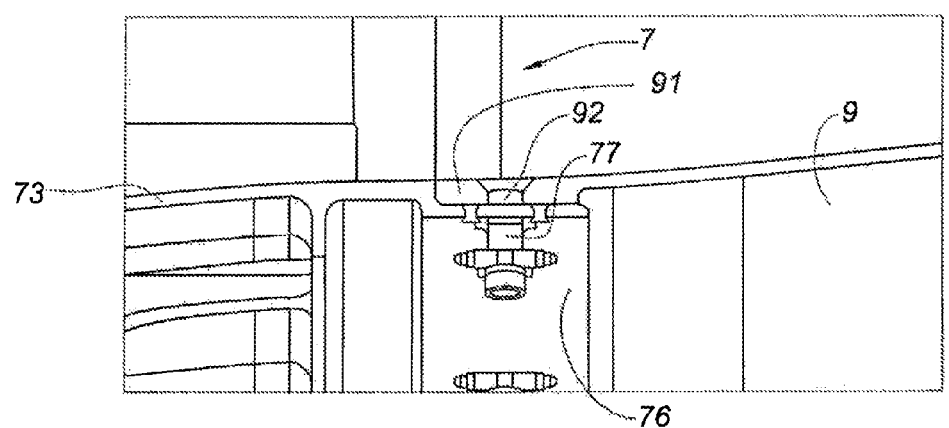
FIG. 2 shows a connection method by axial flanges to which the invention applies by way of an axial section of an exhaust casing and an exhaust cone.
Figure 4:
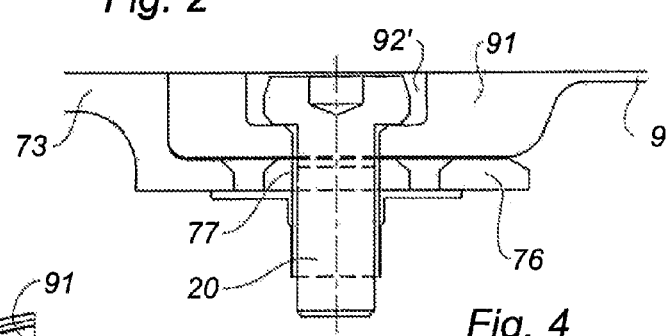
FIG. 4 shows an enlarged view of the connection region between the two parts in FIG. 2.
Figure 3:
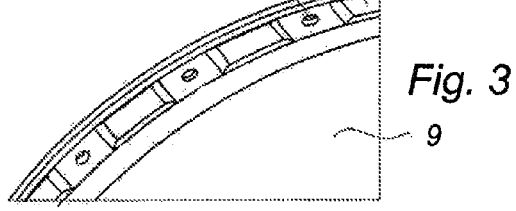
FIG. 3 shows a perspective view of the inside of an embodiment of the flange of the exhaust cone radially scalloped.
Figure 5:
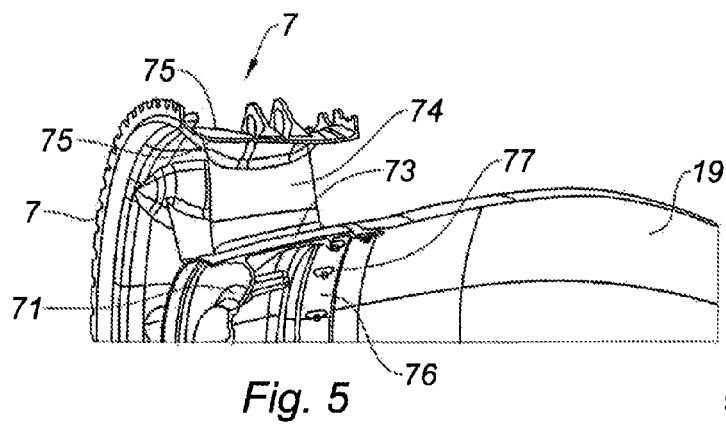
FIG. 5 shows a perspective view of the section in FIG. 2.

FIGS. 2, 3, and 4 show the method of connecting the exhaust cone to the exhaust casing, by means of annular axial flanges respectively rigidly connected to each other.

The exhaust casing 7 has a hub 71, an internal collar 73 and an external collar 75 connected by radial arms 74. The opposite walls of the two collars define between them the stream of the primary flow passing through the exhaust casing. On the downstream edge of the internal collar 73, an annular flange 76 extends axially downstream; this flange is for example cylindrical, has the same axis as the casing, and comprises a plurality of orifices 77 pierced radially in its wall. It forms the internal flange.

The exhaust cone 9 fixed to the exhaust casing 7 has an axial annular flange 91 forming the external flange, the inside diameter of which corresponds to the outside diameter of the flange 76 of the casing 7. The outside diameter of the flange 91 of the cone 9 corresponds to the outside diameter of the internal collar 73 so that the internal wall of the stream is continuous without any difference in level when passing from the internal collar 73 to the exhaust cone 9.

Radial orifices 92 are formed in the flange 91 opposite radial orifices 77 in the flange 7 so that screws 20 or other mechanical fixing means provide the connection between the two parts. The screws are introduced through the stream and the external flange, the orifices in the internal flange have a screw thread coordinated with that of the screws. The screw thread may be in the form of a tapping of the orifices 77 of the internal flange or nuts may be attached under the internal flange 7. The nuts are for example floating while being riveted or clamped. In FIG. 4 the nuts are shown as being riveted to the flange.

The screw heads may remain protruding in the stream; it is necessary in this case to ensure protection of said screw heads. In order to reduce the aerodynamic impact, the heads are preferably embedded in the thickness of the wall. There exist several means: the screw heads are of any type but embedded in a countersink machined in the thickness of the flange, here countersink 92' as can be seen in FIG. 4. The screw heads are milled. It is then necessary to guard against any jamming.

This solution of bolted connection using a radial screw can be associated with press fitting of the flanges with each other in order to make the friction between the two parts contribute to the mechanical strength of the connection and to the sealing. Account is then taken of the differential expansions of the parts and the shear strength of the screws or in order to avoid excessive stresses on the assembly if the male part expands more than the female part. This solution can be adopted when the materials of the two parts have similar coefficients of expansion.

In order to facilitate the insertion of the heads of the screws in the external flange, said flange must be sufficiently thick. The flange may be machined with radial scallops in order to limit the mass impact. As can be seen in FIG. 3, the thickness of the flange 91 is not constant along the circumference. It is thicker at the radial orifices 92 having a surface that comes into contact with the internal flange 76. Between the radial orifices the flange has a smaller thickness, thus ensuring a saving in mass without sacrificing the strength of the part. The flange is said to be scalloped radially.

Advantageously, axial scallops on the flange of the exhaust casing are provided opposite scallops in the exhaust cone while complying with the mechanical strength specifications, in order further to reduce the global mass of the device.

From a manufacturing point of view, this solution has the advantage of being able to use thick metal sheets for the manufacture of the flanges instead of forged, thus reducing the production cost.

In accordance with the invention, to solve the problems related to the difficulties of mounting the exhaust cone, the integration of a guiding system is provided. Said guiding system comprises an axial guiding means and a means forming a protuberance. The axial guiding means is formed according to the preferred embodiment by a recess or groove on one of the flanges and a pin or rivet mounted on the other.

Figure 6:
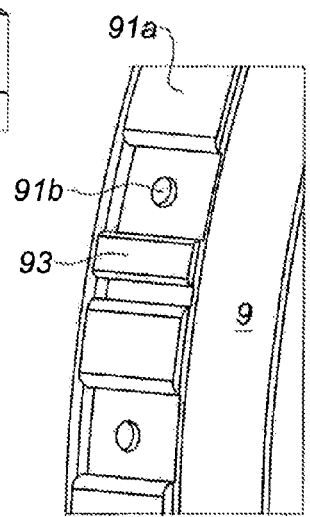
FIG. 6 shows a perspective view of the inside of the exhaust cone in the region provided with the recess forming the guiding means.
Figure 7A:
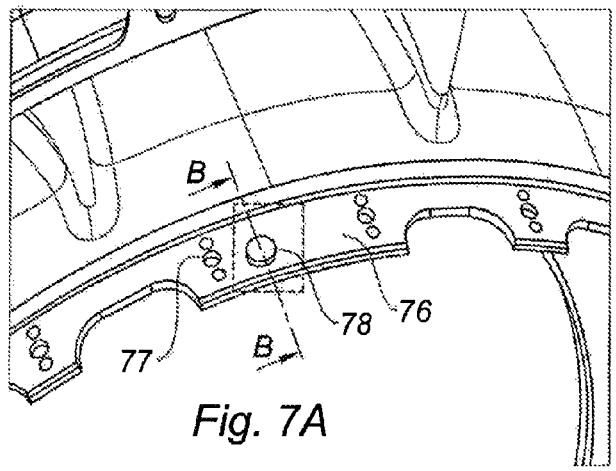
FIG. 7A and 7B show the rivet mounted on the internal flange, FIG. 7B being the cross section along BB in FIG. 7A.
Figure 7B:
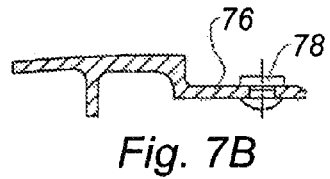
Figure 8:
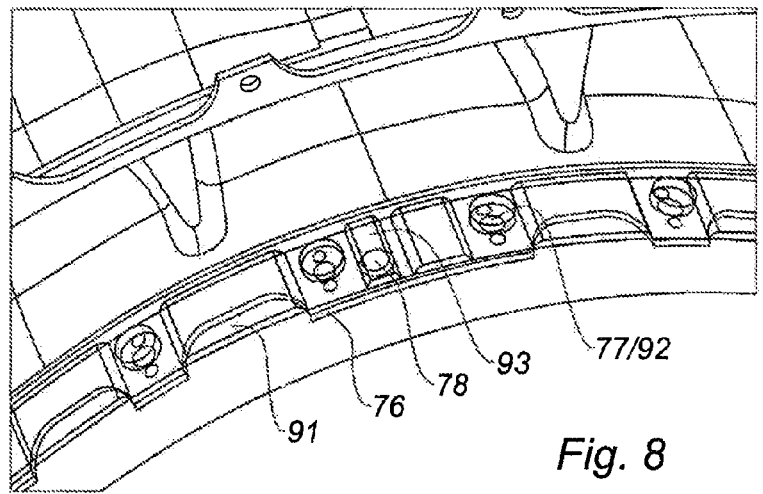
FIG. 8 shows the whole of the connection between the two flanges, by transparency.

FIG. 6 is a partial view of the flange 91 of the exhaust cone 9. This flange is scalloped radially, the scalloped regions 91a and the contact regions 91b being pierced with orifices 92 for the attachment means to pass through. The scalloped regions 91a are thinner than the contact regions. A recess 93 is machined in the thickness of the flange. This recess has edges parallel to the axis of the cone. The width of the recess between the parallel edges is substantially equal to that of the head of a rivet 78 that is mounted on the axial flange 76 of the exhaust casing. The rivet 78 is shown in the partial view of the internal flange of the exhaust casing, FIG. 7A and 7B. It will be noted in FIG. 7A that an axial scallop has been omitted in order to make it possible to house the rivet 78 on the flange 76. FIG. 8 shows in transparency the two assembled flanges. The head of the rivet 78, rigidly connected to the internal flange 76, is engaged in the recess 93 rigidly connected to the external flange 91. Their angular positioning about the axis of the engine is coordinated with that of the orifices 77 and 92 respectively.

In order to mount the exhaust cone 9 on the casing 7, the cone is slid by means of its flange 91 around the flange 76 of the casing while having previously aligned the recess 93 with the rivet 78 forming the guiding means, until the assembly shown in FIG. 8 is obtained. Where applicable this operation is combined with the press fitting of one flange on the other. Next, the screws 20 are inserted, from the gas stream, into the respective aligned orifices of the two flanges and are screwed.

In order to facilitate the bringing together of the parts of relatively large diameters, the guiding means is advantageously arranged angularly in the position that affords visual inspection by the operators.

In accordance with an additional feature, the guiding means is associated with a foolproofing means so as to prevent the unsuitable engagement of the rivet in what would be a random one of the passages, that is to say the scallops, and thus to cancel out the guidance function.

This foolproofing is obtained only in the case of a radially scalloped flange, as in the present embodiment, by machining the recess in such a way that its radial depth is greater than that of the scallops and by using a rivet the head of which comes into contact with the bottom of the recess. By virtue of this simple solution, if the rivet is not aligned with the recess it comes up against the edge of the flange. The operator must thus ensure that he offers up the cone in the correct angular position and then he merely has to move the cone in the axis until it comes into abutment against the rear edge of the flange.

The embodiment depicted here is not limitative; other arrangements are included in the invention. Thus, for example, the flanges may be reversed radially. The guiding means may be inverted. Likewise the scallops may be produced differently.

The invention claimed is:
1. An assembly comprising:
an exhaust casing of a gas turbine engine, the exhaust casing including a hub, an internal collar, an external collar, and a plurality of radial arms connecting the internal collar and the external collar; and
an exhaust cone for the gas turbine engine,
wherein the exhaust casing includes a first axial annular flange extending axially downstream from a downstream edge of the internal collar,
wherein the exhaust cone includes a second axial annular flange provided at an upstream end of the exhaust cone, an inside diameter of the second axial annular flange with respect to an axis of the gas turbine engine corresponds to an outside diameter of the first axial annular flange with respect to the axis of the gas turbine engine, and an outside diameter of the second axial annular flange with respect to the axis of the gas turbine engine corresponds to an outside diameter of the internal collar with respect to the axis of the gas turbine engine such that the internal collar and the second axial annular flange are continuous without any difference in level when passing from the internal collar to the second axial annular flange,
wherein the first and second axial annular flanges are engaged to each other, the second axial annular flange being radially, with respect to the axis of the gas turbine engine, external, the first axial annular flange being radially, with respect to the axis of the gas turbine engine, internal, and the first and second axial annular flanges being held together by mechanical attachment means passing through radial orifices provided in the first and second axial annular flanges,
wherein an inner circumferential surface of the second axial annular flange abuts, in a direction perpendicular to the axis of the gas turbine engine, an outer circumferential surface of the first axial annular flange,
wherein an upstream end of the second axial annular flange abuts, in a direction parallel to the axis of the gas turbine engine, the downstream edge of the internal collar, and wherein one of the first and second axial annular flanges includes a radial protuberance and the other of the first and second axial annular flanges includes a means for axial guidanc of the radial protuberance, such that during an operation of assembling the first and second axial annular flanges with each other, the radial protuberance cooperates with the means for axial guidance of the radial protuberance so that the exhaust cone occupies an angular position that is predetermined with respect to the exhaust casing, the radial protuberance being circumferentially adjacent to one of the radial orifices provided in the one of the first and second axial annular flanges.

2. The assembly according to claim 1, wherein the mechanical attachment means include screws engaged in the radial orifices in the second axial annular flange cooperating with the radial orifices in the first axial annular flange which are tapped, or the radial orifices being provided in nuts attached to the first axial annular flange which are tapped.

3. The assembly according to claim 2, wherein heads of the screws are at least in part embedded in a thickness of a wall of the second axial annular flange.

4. The assembly according to claim 1, wherein the first and second axial annular flanges are held on each other also by press fitting.

5. The assembly according to claim 1, wherein the radial protuberance is a pin or rivet attached to the one of the first and second axial annular flanges.

6. The assembly according to claim 1, wherein at least one of the first and second axial annular flanges comprises radial scallops.

7. The assembly according to claim 6, wherein the means for axial guidance of the radial protuberance comprises a groove, a bottom of which is at a distance from an axis of the cone which is less than a distance from a bottom of the radial scallops to the axis of the cone.

8. A gas turbine comprising:
an assembly, the assembly comprising:
an exhaust casing of the gas turbine engine, the exhaust casing including a hub, an internal collar, an external collar, and a plurality of radial arms connecting the internal collar and the external collar: and
an exhaust cone for the gas turbine engine,
wherein the exhaust casing includes a first axial annular flange extending axially downstream from a downstream edge of the internal collar,
wherein the exhaust cone includes a second axial annular flange provided at an upstream end of the exhaust cone, an inside diameter of the second axial annular diameter of the first axial annular flange with respect to the axis of the gas turbine engine, and an outside diameter of the second axial annular flange with respect to the axis of the gas turbine engine corresonds to an outside diameter of the internal collar with respect to the axis of the gas turbine engine such that the internal collar and the second axial annular flange are continuous without any difference in level when passing from the internal collar to the second axial annular flange, wherein the first and second axial annular flanges are engaged to each other, the second axial annular flange radially, with respect to the axis of the gas turbine engine, external, the first axial annular flange being radially, with respect to the axis of the gas turbine engine, internal, and the first and second axial annular flanges being held together by mechanical attachment means passing through radial orifices provided in the first and second axial annular flanges, wherein an inner circumferential surface of the second axial annular flange abuts, in a direction perpendicular to the axis of the gas turbine engine, an outer circumferential surface of the first axial annular flange, wherein an upstream end of the second axial annular flange abuts, in a direction parallel to the axis of the gas turbine engine, the downstream edge of the internal collar, and wherein one of the first and second axial annular flanges includes a radial protuberance and the other of the first and second axial annular flanges includes a means for axial guidance of the radial protuberance, such that during an operation of assembling the first and second axial annular flanges with each other, the radial protuberance cooperates with the means for axial guidance of the radial protuberance so that the exhaust cone occupies an angular position that is predetermined with respect to the exhaust casing, the radial protuberance being circumferentially adjacent to one of the radial orifices provided in the one of the first and second axial annular flanges.

\* \* \* \* \*

UNITED STATES PATENT AND TRADEMARK OFFICE
CERTIFICATE OF CORRECTION

PATENT NO. : 9,897,011 B2  
APPLICATION NO. : 14/403305  
DATED : February 20, 2018  
INVENTOR(S) : Mario Cesar De Sousa et al.

Page 1 of 1

It is certified that error appears in the above-identified patent and that said Letters Patent is hereby corrected as shown below:

In the Claims

Column 7, Line 4, Claim 1 change "axial guidanc of" to --axial guidance of--;

Column 8, Line 3, Claim 8 change "annular diameter" to --annular flange with respect to an axis of the gas turbine engine corresponds to an outside diameter--;

Column 8, Line 7, Claim 8 change "engine corresonds to" to --engine corresponds to--; and Column 8, Line 15, Claim 8 change "annular flange" to --annular flange being--.

Signed and Sealed this  
Twenty-fifth Day of February, 2020

Andrei Iancu  
*Director of the United States Patent and Trademark Office*